May 19, 1953  L. W. SHRODE  2,639,167
APPARATUS FOR AID IN GRADING EXAMINATIONS
Filed Jan. 27, 1950  5 Sheets-Sheet 1

INVENTOR,
LEROY W. SHRODE,
By Hubert A. Ventura,
ATTORNEY.

May 19, 1953 — L. W. SHRODE — 2,639,167
APPARATUS FOR AID IN GRADING EXAMINATIONS
Filed Jan. 27, 1950 — 5 Sheets-Sheet 2

INVENTOR,
LEROY W SHRODE,
By Herbert A. Neinturm,
ATTORNEY.

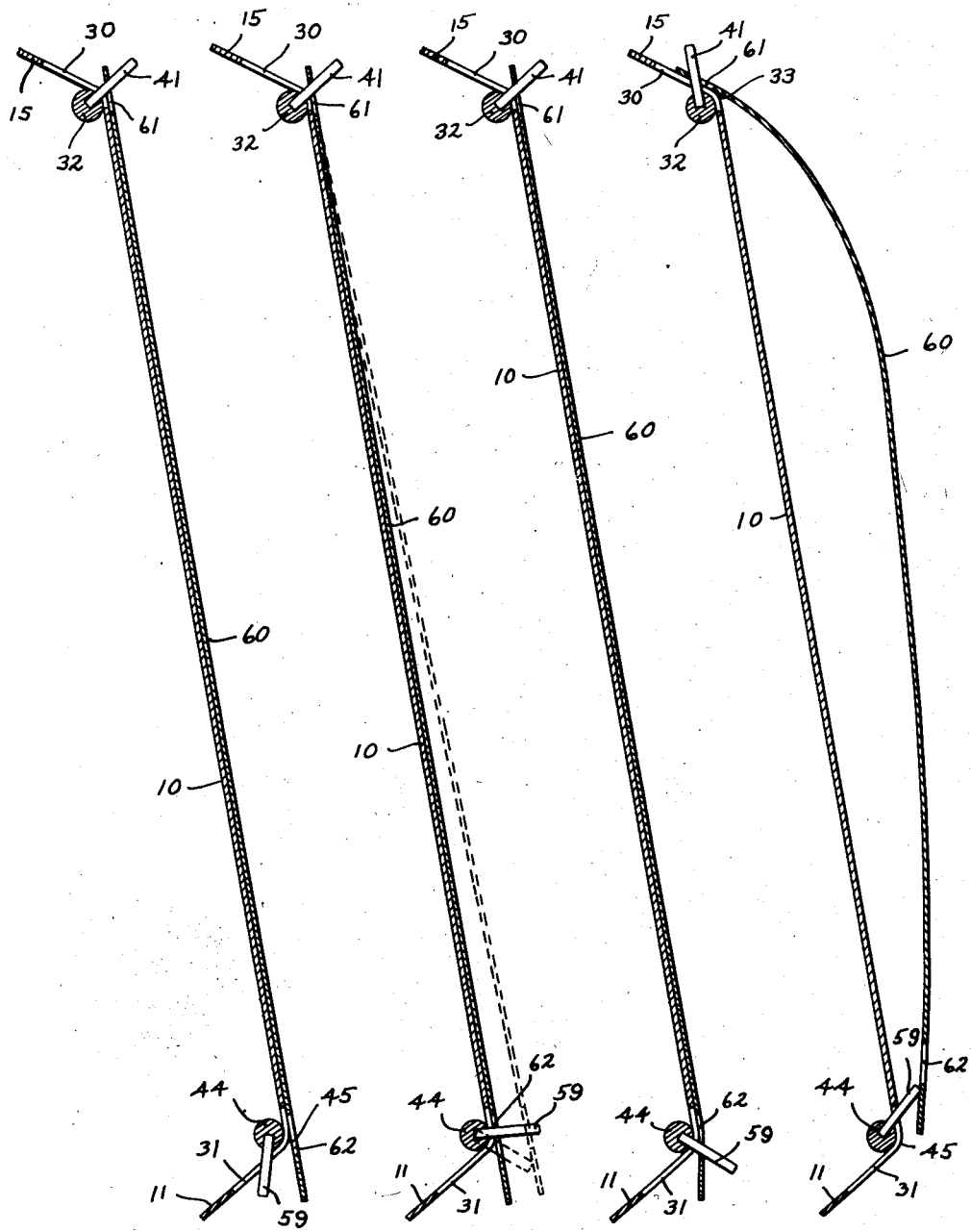

May 19, 1953

L. W. SHRODE 2,639,167

APPARATUS FOR AID IN GRADING EXAMINATIONS

Filed Jan. 27, 1950

INVENTOR,
LEROY W. SHRODE,
By Herbert Q. Minturn,
ATTORNEY.

Patented May 19, 1953

2,639,167

UNITED STATES PATENT OFFICE 2,639,167

APPARATUS FOR AID IN GRADING EXAMINATIONS

Leroy W. Shrode, Vanderburg, Ind.

Application January 27, 1950, Serial No. 140,919

1 Claim. (Cl. 281—44)

This invention relates to an apparatus for facilitating the grading of examinations. The invention involves the combination in a structure whereby a number of individual cards or tapes upon which the record of the examination has been made, may be placed side by side on a table which is held in an inclined position, whereby the answers to a common question may be checked along lines horizontally disposed across the table, preferably in conjunction with a master answer tape or card for direct comparison as to the correctness or incorrectness of the answer.

The invention particularly resides in the means in the combination of structural elements embodied in the table structure whereby the individual cards or tapes may be quickly applied, maintained in correct positions, and then released, not only to insure accuracy in the grading operation, but to reduce the time required for examination.

The structure as above indicated is produced in a very simple form at a relatively low cost of production, and is easily and readily operated without employment of tools, so that no training or technical experience is required of the operator.

The invention will be better understood in the following description of one particular form thereof as illustrated in the accompanying drawings, in which Fig. 1 is a view in front elevation of a structure embodying the invention;

Fig. 4 is a diagrammatic view in vertical section through the table to illustrate the initial step of applying the individual examination tape;

Figure 8:
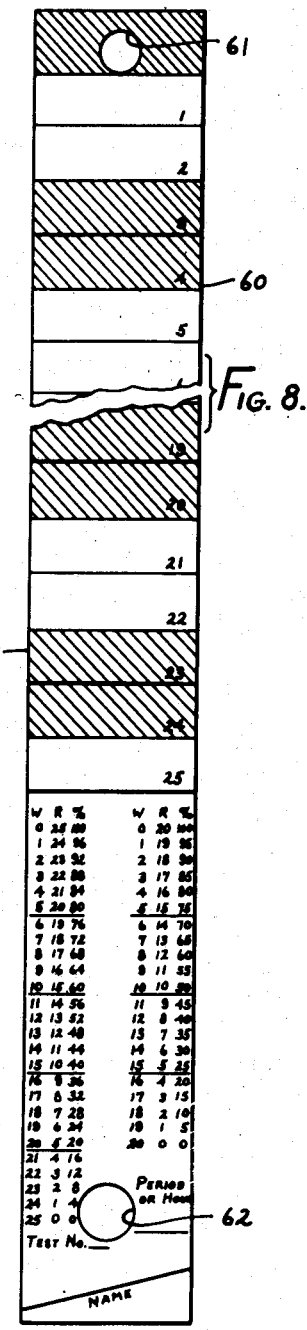

Fig. 5 a view similar to that shown in Fig. 4, illustrating the second step in mounting the tape on the table;

Fig. 6 a view similar to that shown in Fig. 4 illustrating the third step;

Fig. 7 a further view similar to that of Fig. 4 illustrating the operation preliminary to removing the tape from the table;

Fig. 8 a view in top plan of an individual tape; and

Figure 9:
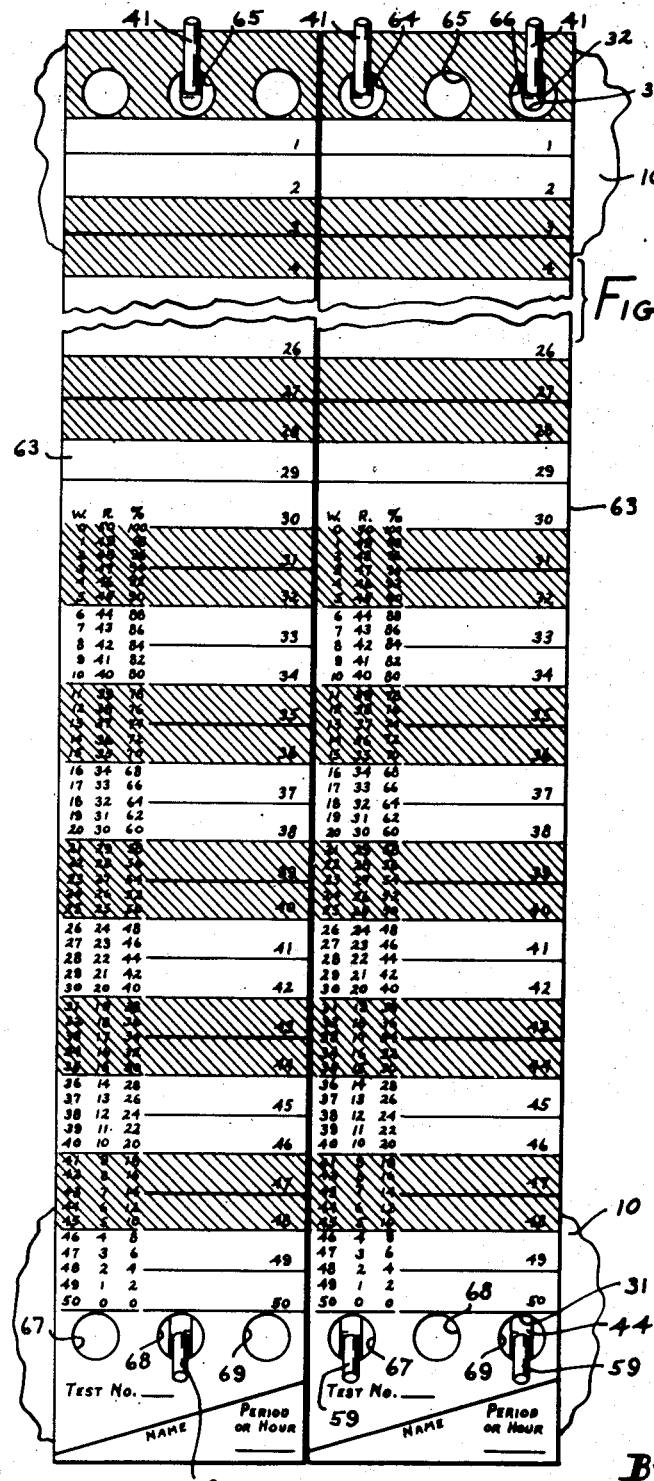

Fig. 9 a view in top plan or front elevation of a modified form of tape mounted on the table.

Referring to the drawings, in which like characters of references indicate like parts, a table generally designated by the numeral 10 is formed out of any suitable material such as sheet metal to have a length suitable to the number of examination tapes to be checked at one time, for example, without limiting the invention thereto, a table length of approximately forty-two inches will accommodate in the present form of the invention thirty-one of the examination tapes. A suitable height would be around thirteen inches. In other words the length is slightly over three times the height. The front or upper side of the table 10 is planar, and is provided with a lower flange 11 turned integrally from the lower portion of the table 10 to be inclined downwardly and rearwardly to terminate in a rearwardly and relatively horizontally disposed lip 12. Near the ends of the lip 12, there is fixed respectively a foot 13 and 14, to be made out of some resilient or flexible material of a non-scratching nature such as rubber.

From the upper longitudinal edge portion of the table 10, there is turned rearwardly and relatively horizontally a flange 15, from the rear portion of which there is a downturned leg 16. There are a pair of reenforcing members 17 and 18 spaced apart one from the other on the under side of the table 10, and spaced below the underside of the table to have their upper ends secured to the underside of the top flange 15, and their lower ends secured to the lower flange 11. The table 10 is stiffened intermediate its top and bottom portions by inserting a member, such as a strip of wood 19 between the reenforcing members 17 and 18 and the back of the table 10, this strip 19 being in direct contact with the under face of the table 10 and the forward or upper faces of the reenforcing members 17 and 18, and secured thereto in any suitable manner such as by the screws 20.

Figure 2:
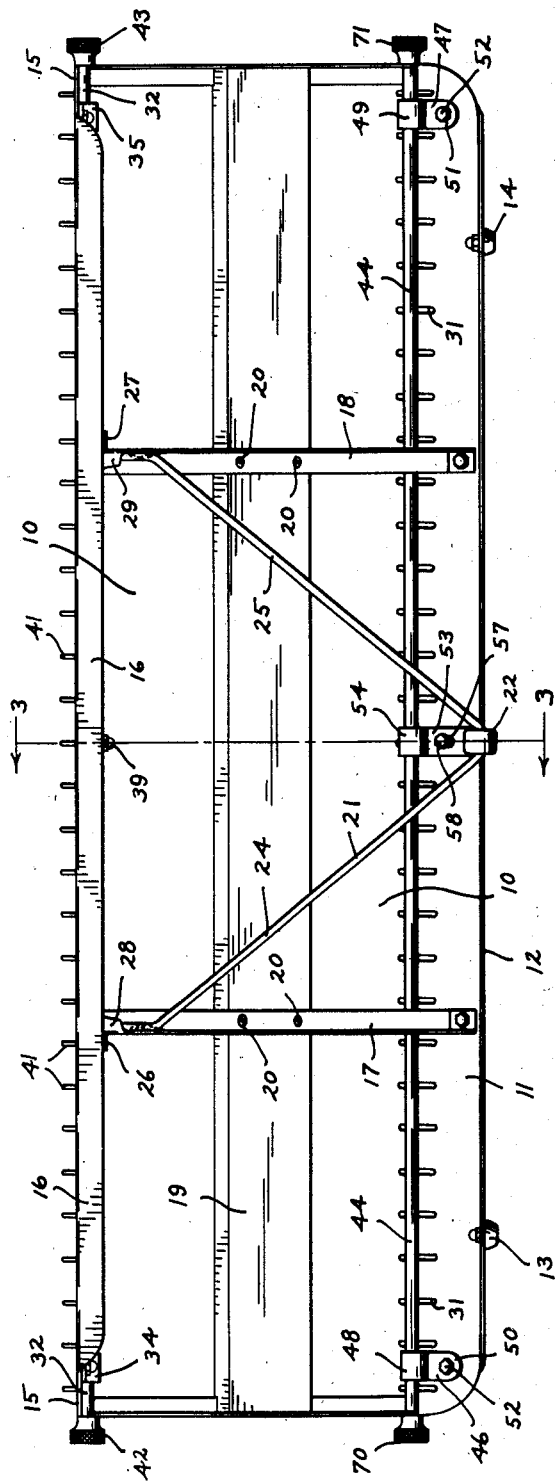
Fig. 2 is a view in rear elevation.
Figure 3:
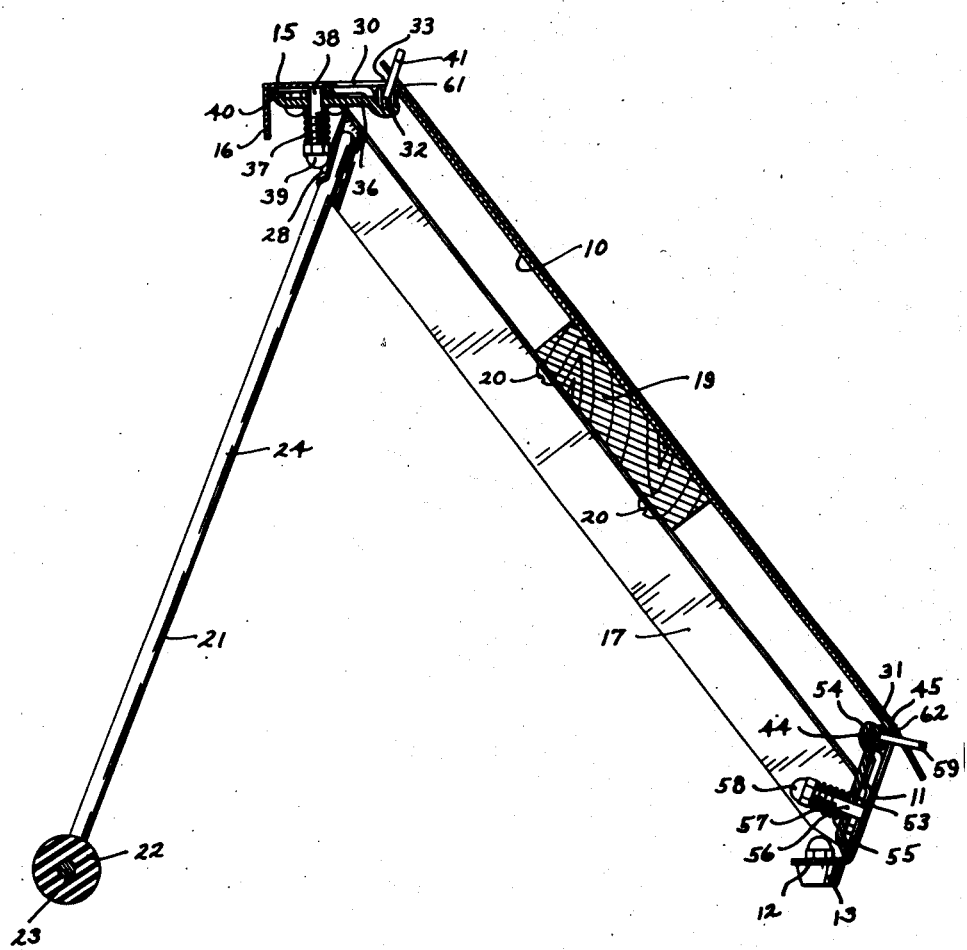
Fig. 3 is a view in vertical transverse section on the line 3—3 in Fig. 2, and on an enlarged scale.

A rear leg 21 is formed to support the table 10 in the inclined position as indicated in Fig. 3, whereby the angle of inclination of that table 10 is preferably within the range of from fifty to sixty degrees from the horizontal. The leg 21 in the present showing consists of a spring wire having the resilient foot 22 herein shown as in the form of a rubber roller mounted on a horizontally disposed length 23 of a portion integrally interconnecting two diverging lengths 24 and 25 forming the leg 21. The upper ends of the lengths 24 and 25 are respectively formed to have oppositely turned pins 26 and 27 rockably extending through the reenforcing members 17 and 18, Fig. 2. These members 17 and 18 are provided with turned over stops 28 and 29 in the paths of upper portions of the lengths 24 and 25 so as to limit the outward swinging of the leg 21 from the rear side of the table 10 to some such position as is indicated in Fig. 3. When in that outwardly swung position, the front of the table 10 will be in the desired inclined position.

A plurality of slots 30 are provided in regularly spaced apart positions along the forward portion of the top flange 15, the forward ends of these slots 30 being continued around into the table 10, Fig. 3. The lower flange 11 is likewise provided with a plurality of slots 31, the upper portions of these slots being continued around and through the lower end portion of the table 10. The slots 30 and 31 are in vertical alignment one with the other across the table 10. In the present showing, there are thirty-one of these top and bottom slots 30 and 31.

A shaft 32 is mounted to extend longitudinally across the underside of the table 10 to fit within the bend 33 between the table 10 and the upper flange 15. This shaft 32 is rockably maintained in that bend by means of the clips 34 and 35, Fig. 2. The shaft 32 is freely revoluble in respect to these holding clips 34 and 35, but a central clip 36 bears against the underside of the shaft 32 in a yielding manner so as to apply pressure against the shaft 32 in order to hold the shaft 32 in any revolved position. In the present showing, this clip 36 is held against the underside of the shaft 32 in a yielding manner by means of a spring 37 mounted upon a bolt 38 which is passed downwardly through the flange 15 to be held thereby, and through the clip 36 to extend through the spring 37 and have a nut 39 screw-threadedly engaged on its lower end as a means of compressing the spring 37 against the underside of the clip 36. The clip 36 bears by its forward end portion around the shaft 32, and by a rear foot 40 against the underside of the flange 15.

The shaft 32 is provided with a plurality of pins 41 each rigidly fixed to the shaft 32 to extend through a slot 30. In other words, with thirty-one of the slots 30, there being a pin 41 for each slot, there will be thirty-one pins 41. On each end of the shaft 32 there is fixed a knurled head 42 and 43 respectively as a device for revolving the shaft 32 at will within the limits of the pins 41 striking the ends of the slots 30.

A lower shaft 44 is mounted to be revoluble within the bend 45 between the table 10 and the flange 11. The shaft 44 is freely revoluble between that bend 45 and the holding clips 46 and 47 mounted at respective end portions of the table 10 back of the flange 11. The upper ends of these clips 46 and 47 are each provided with the feet 48 and 49 curved around to fit the contour of the shaft 44. Flat feet 50 and 51 respectively bear against the back side the flange 11 and are fixed thereto by means of screws 52. In order to retain the shaft 44 in the desired rocked position, some frictional holding means is provided. In the form herein shown, this frictional means consists of a clip 53 having a rounded foot 54 bearing against the back side of the shaft 44, and has a foot 55 to bear against the flange 11 to hold the clip 53 in general in spaced relation behind the flange 11. A bolt 56 passes rearwardly through the flange 11, loosely through the clip 53, to extend through a spring 57, and receive a nut 58 screw-threadedly on its rear end as a means for adjustably compressing the spring 57 between that nut 58 and the clip 53 to rock the end foot 54 against the shaft 44 to apply the frictional pressure as may be desired.

The shaft 44 is provided with a plurality of pins 59, one pin 59 for each slot 31. These pins 59 are fixed to shaft 44 in a rigid manner and extend through those slots in each instance as indicated in Fig. 3 particularly.

Referring to Fig. 8, a member 60 is illustrated, and may be made out of any suitable material such as paper or cardboard, and will hereinafter be referred to as a tape by reason of its elongated nature. The essential characteristics of this tape 60 are that it has at its upper and lower ends the respective holes 61 and 62 therethrough.

The tape 60 carries on its front face a plurality of transverse lines, one line for each question of the examination. For example, as indicated in Fig. 8, there would be a total number of questions in the permissible examination for which this tape is made of twenty-five questions. Of course less questions may be used in the examination. Each line from one through twenty-five is intended to be used, on which line the answer to the specific question of the examination is to be entered. On the lower part of the tape, there are provided two tables, one table for the grades involved in answering twenty-five questions, and the other table, the right-hand table, showing the grades involved in answering twenty questions. These tables are provided for quick reference in order to prevent having to calculate the total grade. Further, the tape 60 has at regularly spaced apart intervals, herein shown as two lines apart, a color area involving the space allotted to the next adjacent two lines. For example, lines one and two are left in the natural color of the tape, whereas lines three and four have a colored background. This system is carried down throughout the tape for the various lines therebelow.

A modified form of tape 63, Fig. 9, is illustrated wherein the tape is wider than the tape 60 to permit longer answers, and also to permit the examination having up to fifty questions. In this tape 63, the upper portion thereof has three holes 64, 65, and 66 therethrough adjacent the upper marginal edge portion, and then the lower portion of the tape 63 has three holes 67, 68, and 69 therethrough adjacent the lower end portion.

The holes 64 and 66 are spaced apart to have their centers spaced the distance between the centers of the upper pins 41. The central hole 65 is centered between those outer holes 64 and 66. Its center is on the common horizontal center line through those outer holes. The outer lower holes 67 and 69 are spaced to be centered on the adjacent pins 59, and the central hole 68 is spaced equidistant between the holes 67 and 69 to be on the horizontal center line through those two outer holes 67 and 69.

Figure 1:
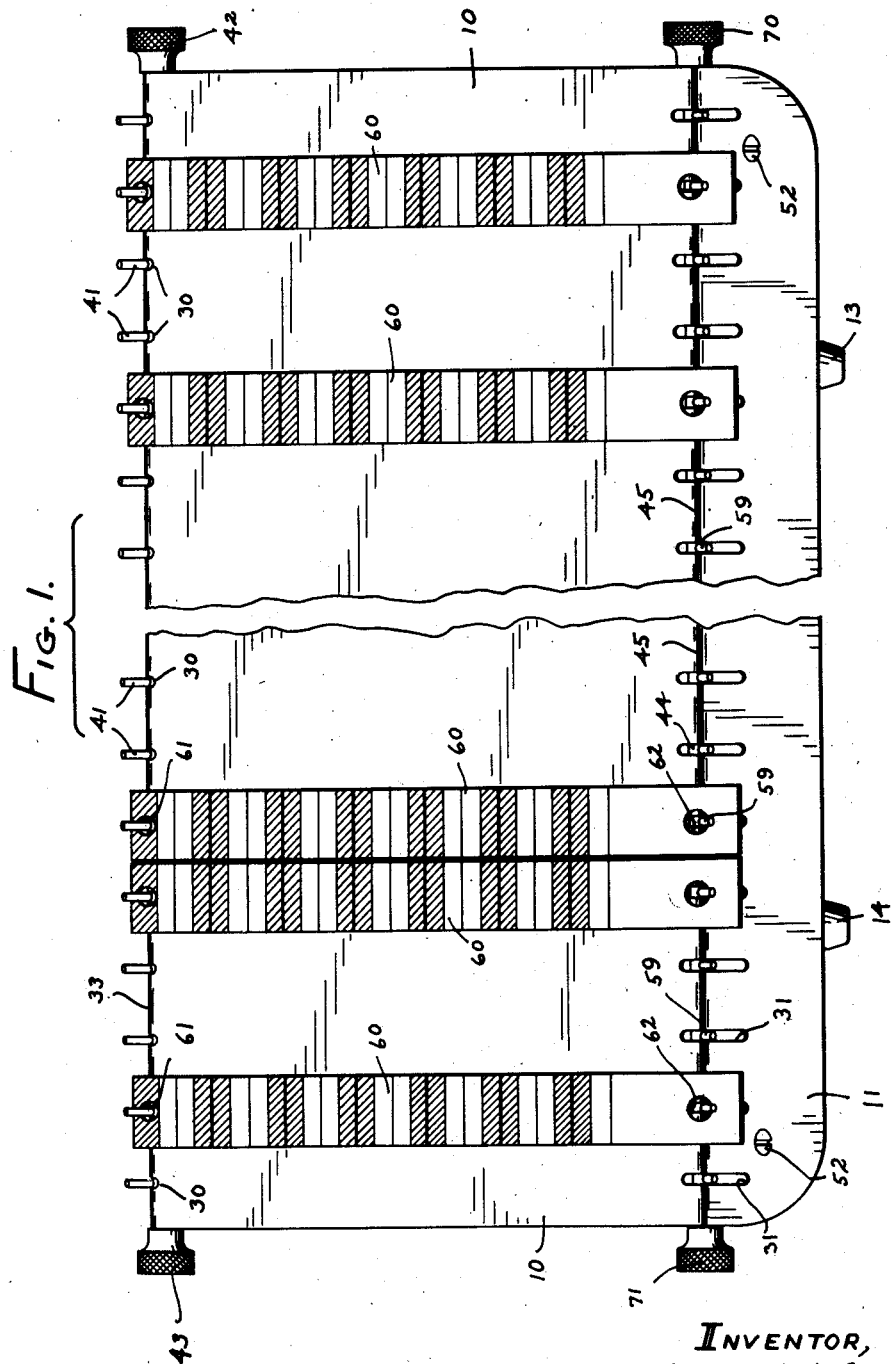

Referring to Fig. 1, the table 10 is illustrated as carrying a few of the tapes 60, the indicia appearing on the tape 60 in Fig. 8 being purposely omitted to avoid confusion. As indicated in Fig. 1, the tape 60 has the pin 41 passing through the upper hole 61 of the tape, to allow the tape 60 to hang downwardly over the face of the table 10. The width of these various tapes 60 are made to be such that when they are so suspended from the upper pins 41, they may lay side by side without overlapping. When the tapes 60 are placed on the table 10, the pins 41 are carried by rocking the shaft 32 to the upwardly directed positions as indicated in Figs. 1 and 4–6. By having the pins 41 inclined upwardly from the horizontal, the tape 60 are held and are easily removed from the pins without physically lifting the tapes 10.

When all of the tapes 60 have been hung from the upper pins 41, and the lower pins 59 have been previously rocked to some such position as indicated in Fig. 4 to be turned or directed back of the plane of the front face of the table 10, the shaft 44 carrying the pins 59 is then revolved through either end knob 70 or 71 fixed thereto so as to rock the pins 59 around to those positions, approaching the horizontal, as indicated in Fig. 5, to allow the tapes 60 to be lifted to some such position as indicated by the dash lines in Fig. 5 to permit the pins 59 to enter the lower hole 62, whereupon the tapes will drop back into contact with the front face of the table 10 to assume the position as indicated in Fig. 5. The next step is to revolve the shaft 44 to rock the pins 59 downwardly while extended through the holes 62 in order to apply tension to the tape 60 by stretching it from the upper pin 41 in each instance. The tape 60 then remains in this tensioned condition while the checking of the various tapes is made to ascertain the grades to be assigned to each tape.

Upon completing the checking and grading of each tape 60, the lower shaft 44 is then revolved in a counterclockwise direction, Fig. 7 to substantially the upper permissible limit of travel of the pins 59 within their slots 31. The upper shaft 32 is then revolved in a counterclockwise direction, Fig. 7, which pulls the tape 60 upwardly to relieve the lower end portion from engagement with the pin 59 in each instance as indicated in Fig. 7. In other words rocking the shaft 32 lifts the tape 60 so that the lower end of the tape slides off the pin 59 and assumes some such position as indicated in Fig. 7, the upper portion of the tape being bowed outwardly from the table 10 in that disengaging process. With the tape 60 thus held outwardly from the table 10, the operator's fingers may be inserted under the tapes 60 one after another to lift them from engagement with the upper pins 41.

In the checking and grading operation, the fact that the tape 60 is in each instance divided into a two-color arrangement as indicated in Fig. 8, it is easy to follow a horizontal line entirely across the board 10, from the corresponding line of one tape 60 to the corresponding lines of the next succeeding tapes. The various lines may be marked right or wrong, and then the final grade in accordance with the correctness of the answers may be marked on the tape, and the tape returned to the person who has taken the examination as identified at the lower end of the tape above the line marked "name."

Where tapes of the design shown in Fig. 9, tape 63, are to be employed, one tape 63, the left-hand one in Fig. 9 may be placed on the table 10 by having the central hole 65 receive therethrough the upper pin 41. Then the next adjacent tape 63, the right-hand tape in Fig. 9 is placed on the table 10 by having the outer holes 64 and 66 receive the next two adjacent pins 41. In this manner, tapes 63 may be placed entirely across the table 10 to have their vertical marginal edges in close juxtaposition. Of course if desirable, the tapes 63 may be spaced one from the other by having each succeeding tape hung on a pin 41 passing through the central hole 65 only. The lower holes 67, 68, and 69 receive the lower pins 59 therethrough in the same sequence.

As the drawings indicate, the upper and lower holes through the tapes 60 and 63 are in each instance made to be sufficiently large to permit the upper and lower pins 41 and 59 respectively to pass quite freely therethrough. For example, to illustrate good working conditions, where the pins 41 and 59 are made to be one-eighth of an inch in diameter, the diameters of the holes may range from five-sixteenths to three-eighths of an inch. The vertical spacing apart of the top and bottom holes is made to be substantially equal to that distance between the pins 41 and 59 when they are turned to be substantially perpendicular to the front face of the table 10. This distance may vary of course somewhat by changing the diameters of the holes. The tensioned condition of the tapes 60 as illustrated in Fig. 6, is maintained by reason of the frictional resistance set up to opposite rotation of the upper and lower shafts 32 and 44 as above described.

Therefore it is to be seen that I have provided a very simple structure usable for quick checking of a plurality of examination papers so that the grades may be determined quickly in the minimum amount of time, and still be determined accurately without too much chance of error. While the invention has been described in reference to the grading of examinations, it is of course usable in conjunction with the comparison of data which, for example, is to be checked against a master data sheet. Furthermore, while the elements 60 and 63 have been referred to as tapes, it is intended to include in this term an elongated sheet of flexible material, such as light cardboard or paper, and the exact designation of this element is not to be limited in any sense to the implication that it is of a continuous length, but rather is of a discrete length made to accommodate itself to the vertical height of the table 10. The elements 60 or 63 could equally as well be referred to as tickets or papers or cards.

Therefore I do not desire to be limited to the precise form of the invention as illustrated and described since variations may be employed without departing from the spirit of the invention, and the invention being limited as only as is required by the limitations imposed by the following claim.

I claim:

A grade examination perforated end tape checking aid comprising a table; a flange extending backwardly through a bend from one end of the table; a second flange extending backwardly through a bend from the opposite end of the table; both of said flange bends having spaced apart slots therethrough, a slot in one bend longitudinally aligned with a slot in the second bend; a shaft revolubly mounted back of each of said bends; a plurality of tape receiving pins fixed to said shafts, one pin extending through each of said slots; said slots limiting by their ends the travel of said pins respectively toward said table to approximately upright positions in respect to the table top; and the transverse widths of said slots being less than the diameter of said tape perforations wherein said tapes while being stretched by rocking of said pins through said slots away from said table are withheld from wrapping about said shafts.

LEROY W. SHRODE.

References Cited in the file of this patent

UNITED STATES PATENTS

| Number | Name | Date |
|---|---|---|
| 251,169 | Bogue | Dec. 20, 1881 |
| 1,020,295 | Lewis et al. | Mar. 12, 1912 |
| 1,192,486 | Young | July 25, 1916 |
| 1,429,436 | Kelly | Sept. 19, 1922 |
| 1,695,575 | Cohen | Dec. 18, 1928 |
| 1,731,017 | Lewis | Oct. 8, 1929 |
| 1,883,255 | Unger | Oct. 18, 1932 |
| 1,884,814 | Niemann et al. | Oct. 25, 1932 |
| 1,979,814 | Unger | Nov. 6, 1934 |
| 2,117,812 | Meyer | May 17, 1938 |
| 2,262,278 | Godley | Nov. 11, 1941 |
| 2,265,474 | Critchfield | Dec. 9, 1941 |

FOREIGN PATENTS

| Number | Country | Date |
|---|---|---|
| 614,957 | Great Britain | Dec. 30, 1948 |